(12) United States Patent
Huang et al.

(10) Patent No.: US 11,865,774 B2
(45) Date of Patent: Jan. 9, 2024

(54) METHOD FOR BINDER ADDITIVE MANUFACTURING

(71) Applicant: K.L. CHEMICALS CO., LTD., Taichung (TW)

(72) Inventors: Chien-Szu Huang, Taichung (TW); Ting-Chi Lai, Taichung (TW)

(73) Assignee: K.L. CHEMICALS CO., LTD., Taichung (TW)

( * ) Notice: Subject to any disclaimer, the term of this patent is extended or adjusted under 35 U.S.C. 154(b) by 304 days.

(21) Appl. No.: 17/349,181

(22) Filed: Jun. 16, 2021

(65) Prior Publication Data

US 2022/0203610 A1   Jun. 30, 2022

(30) Foreign Application Priority Data

Dec. 24, 2020 (TW) .................................. 109146023

(51) Int. Cl.
| | | |
|---|---|---|
| *B29C 64/165* | (2017.01) | |
| *B33Y 10/00* | (2015.01) | |
| *B33Y 70/10* | (2020.01) | |
| *B22C 1/22* | (2006.01) | |
| *B22C 9/02* | (2006.01) | |
| *B29K 105/00* | (2006.01) | |
| *B29K 459/00* | (2006.01) | |

(52) U.S. Cl.
CPC ............ *B29C 64/165* (2017.08); *B22C 1/224* (2013.01); *B22C 1/2253* (2013.01); *B22C 9/02* (2013.01); *B29K 2105/251* (2013.01); *B29K 2459/00* (2013.01); *B29K 2909/14* (2013.01); *B33Y 10/00* (2014.12); *B33Y 70/10* (2020.01)

(58) Field of Classification Search
CPC ......... B22C 1/224; B22C 1/2253; B22C 9/02; B29C 64/165; B33Y 10/00; B33Y 70/00
See application file for complete search history.

(56) References Cited

U.S. PATENT DOCUMENTS

| | | | | |
|---|---|---|---|---|
| 2014/0296372 A1* | 10/2014 | Iwamoto | ................ | C09J 161/34 523/144 |
| 2017/0037222 A1* | 2/2017 | Nagai | ........................ | B22C 9/02 |
| 2017/0297263 A1* | 10/2017 | Ederer | ..................... | C09D 7/61 |
| 2020/0139427 A1* | 5/2020 | Hurkes | .................. | B33Y 70/00 |

* cited by examiner

*Primary Examiner* — Mary Lynn F Theisen
(74) *Attorney, Agent, or Firm* — Muncy, Geissler, Olds & Lowe, P.C.

(57) ABSTRACT

A method for additive manufacturing is provided, including: mixing a hardener with a sand material, so that the hardener is evenly coated on a surface of the sand material, and then spraying a binder through a nozzle, reacting the binder sprayed through the nozzle with the surface of the sand material evenly coated with the hardener to harden a sand mold. Therefore, the problem of nozzle clogging may be overcome, and a solid with a particle size of less than 0.6 μm may be obtained by the additive manufacturing. In addition, the hardening speed can be adjusted according to the size of the sand mold. Compared with a general sand mold product, the hardening speed may be increased and the storage life of the binder may be prolonged when the sand mold has a large size.

11 Claims, 4 Drawing Sheets

METHOD FOR BINDER ADDITIVE MANUFACTURING

BACKGROUND

Technical Field

The present invention relates to an additive manufacturing technology, and in particular, to a method for a binder additive manufacturing by using additive deposition, additive agglomeration, and additive layering for manufacturing three-dimensional objects.

Related Art

Resin is one of the common 3D printing materials. There are two global leading manufacturers in the use of the technology of forming sand molds for casting by spraying binding agents, namely Voxelj et AG in Germany and ExOne in America. The materials used in Voxelj et AG include silica sand, PMMA granular materials, and plaster, and the materials used in ExOne include stainless steel, ceramics, cobalt-chromium alloys, and tungsten carbide.

Voxelj et AG uses a phenolic resin system, and ExOne uses a furan resin system. The difference between the two systems lies in that:

The phenolic resin system is a thermosetting resin. The resin can be sprayed on a surface of a dry sand material directly through a nozzle according to computer aided design (CAD) drawings, and then heated to cure, without premixing with the sand material.

The furan resin system is a self-hardening resin. It is necessary to mix a hardener into a sand material firstly, and then spray the resin on a surface of the sand material by using a nozzle according to CAD drawings to achieve curing. Molding sand is generally made by mixing materials such as raw sand for casting, a molding sand binder, and auxiliary additives in a specific ratio. Depending on the types of the binders used, the molding sand can be classified into resin sand, clay sand, water glass sand, cement sand, and the like. Among them, the clay sand and the resin sand are more commonly used. In the existing casting process, if the furan resin is used as a binder, the molding sand cannot be used, because the resin cannot be cured and molded. Therefore, in the existing technologies, the phenolic resin sand is selected to solve the problems of sand sintering and sticking.

Generally, spraying a binding agent is to bind the binding agent to a thin layer of a powder material, wherein the powder material may be mainly ceramics such as glass or plaster, or metal, such as stainless steel. Therefore, if a binder has a low viscosity, the binder is likely to be sprayed too much through the nozzle, causing a poor bonding effect between the binder and the powder material, so that drying and molding is slowed down. If the binder has a proper viscosity, the bonding effect between the binder and the powder material is good, and the drying and molding is fast. However, if the viscosity of the binder is too high, the binder is not easy to be sprayed out through the nozzle due to sticking to the nozzle, so that the nozzle is prone to be clogged, and requires regular cleaning or maintenance to resolve the clogging of the nozzle. Therefore, the most suitable viscosity of the binder is selected so that it will not stick to the nozzle, and cannot be sprayed too fast through the nozzle during an operation of a print head.

In general, when a press-type equipment is used, if the viscosity of the binder is too high, the binder cannot be sprayed out through the nozzle, and the operation cannot be performed. If the viscosity of the binder is too low, the binder is sprayed too much through the nozzle. At room temperature, the viscosity 4-10 hours before spraying sand through the nozzle is generally controlled in a range of 10 cps to 12 cps.

For fast printing, a proper print head and binder should be selected. The print head may be roughly classified into a continuous jet stream print head and a drop on demand stream print head. The continuous jet stream print head has a plurality of nozzles and a high speed, and is suitable for manufacturing large products. The drop on demand stream print head has few nozzles and a low speed, and is suitable for manufacturing small products.

SUMMARY

Problems to be resolved by the present invention:

The problems of the composition and concentration of a binder: If a binder has a low viscosity, the binder is likely to be sprayed too much through the nozzle, causing a poor bonding effect between the binder and a powder material, so that drying and molding is slowed down. If the binder has a proper viscosity, the bonding effect between the binder and the powder material is good, and the drying and molding is fast. However, if the viscosity of the binder is too high, the binder is not easy to be sprayed out through the nozzle due to sticking to the nozzle, so that the nozzle is prone to be clogged, and requires regular cleaning or maintenance to resolve the clogging of the nozzle.

The problem of the time required for drying after 3D printing: After a binder, a hardener, and a sand material are mixed, the resultant mixture has a high hardening speed when a sand mold has a small size, but has a low hardening speed when the sand mold has a large size, making it impossible to react rapidly to bind the sand material after spraying out through the nozzle, and the hardening speed cannot be adjusted according to the size of the sand mold.

Generally, in a sand mold manufacturing process, for resin binding, the fluid physical properties of the binder may affect the mixing of silica sand, and lead to a poor penetration efficiency between the silica sand and the binder, so that the binding effect may then affect the quality of resin sand molding. Although the related art process can be used for dry sand, ceramic sand, and other materials, when applied to a fine sand material, for example, a fine sand material with a diameter of 9 μm, the process cannot achieve a good sanding effect.

Although the binder and the hardener can be stored at a normal temperature, the binder has a short storage life at the normal temperature.

To resolve the foregoing technical problems, the present invention provides a method for additive manufacturing, comprising the following steps:

stirring 1350-1650 parts by weight of furfuryl alcohol, 2-5 parts by weight of an acid catalyst, 120-180 parts by weight of a phenolic compound, and 60-90 parts by weight of polyoxymethylene to form a mixture of a binder, heating up to 120-150° C. and reacting for 1-2 h, and then dehydrating at 85° C. or below, cooling down to 45° C. or below, and adding 5-10 parts by weight of a coupling agent, to obtain the binder; mixing p-toluenesulfonic acid with pure water in a ratio of 70-80 parts by weight to 20-30 parts by weight to form a mixture of the p-toluenesulfonic acid and the pure water, mixing phosphoric acid with the mixture of the p-toluenesulfonic acid and the pure water in a ratio of 90-100 parts by weight to 3-7 parts by weight, heating the obtained mixture of the phosphoric acid and the mixture of the p-toluenesulfonic acid and the pure water to 60-80° C., and stirring for 1-3 h, to obtain a hardener; mixing the hardener with a sand material in a mass ratio of 0.1-1.0% of the hardener to the sand material, heating at a high temperature of 100-110° C. for mixing, and drying, thereby coating the hardener evenly on a surface of the sand material, and then spraying the binder through a nozzle, with a mass ratio of the binder to the sand material being 0.5-2.5%; reacting the binder sprayed through the nozzle with the surface of the sand material evenly coated with the hardener to harden a sand mold.

Further, in the method for additive manufacturing, the polyoxymethylene is 70-80 parts by weight.

Further, in the method for additive manufacturing, an optimal ratio of the hardener to the sand material is 0.3-0.7%, and an optimal ratio of the binder to the sand material is 0.8-1.5%.

Further, in the method for additive manufacturing, the acid catalyst is one selected from a group consisting of p-toluenesulfonic acid, acetic acid, hydrochloric acid, sulfuric acid, phosphoric acid, and boric acid.

Further, in the method for additive manufacturing, the acid catalyst is p-toluenesulfonic acid.

Further, in the method for additive manufacturing, the phenolic compound is one selected from a group consisting of phenol, bisphenol A, xylenol, m-cresol, resorcinol, and phloroglucinol.

Further, in the method for additive manufacturing, the coupling agent is one selected from a group consisting of 3-methacryloxypropyltrimethoxysilane, 3-aminopropyltriethoxysilane, 3-glycidoxypropyltrimethoxysilane, and 3-(2-aminoethylamino)propyl-dimethoxymethylsilane.

To resolve the foregoing technical problems, the present invention provides a method for producing a binder for additive manufacturing, comprising the following steps:

stirring 1350-1650 parts by weight of furfuryl alcohol, 2-5 parts by weight of an acid catalyst, 120-180 parts by weight of a phenolic compound, and 60-90 parts by weight of polyoxymethylene to form a mixture of a binder, heating up to 120-150° C. and reacting for 1-2 h, then dehydrating at 85° C. or below, cooling down to 45° C. or below, and adding 5-10 parts by weight of a coupling agent, to obtain the binder.

Further, in the method for producing a binder for additive manufacturing, the polyoxymethylene is preferably 70-80 parts by weight.

Further, in the method for producing a binder for additive manufacturing, the acid catalyst is p-toluenesulfonic acid.

To resolve the foregoing technical problems, the present invention also provides a method for additive manufacturing with a basic phenolic resin binder, comprising the following steps:

stirring 1350-1650 parts by weight of furfuryl alcohol, 2-5 parts by weight of an acid catalyst, 120-180 parts by weight of a phenolic compound, and 60-90 parts by weight of polyoxymethylene to form a mixture of a binder, heating up to 120-150° C. and reacting for 1-2 h, and then dehydrating at 85° C. or below, cooling down to 45° C. or below, and adding 5-10 parts by weight of a coupling agent and 5-20 parts by weight of basic phenolic resin, to obtain the binder; mixing p-toluenesulfonic acid with pure water in a ratio of 70-80 parts by weight to 20-30 parts by weight to form a mixture of the p-toluenesulfonic acid and the pure water, mixing phosphoric acid with the mixture of the p-toluenesulfonic acid and the pure water in a ratio of 90-100 parts by weight to 3-7 parts by weight, heating the obtained mixture of the phosphoric acid and the mixture of the p-toluenesulfonic acid and the pure water to 60-80° C., and stirring for 1-3 h, to obtain a hardener; mixing the hardener with a sand material in a mass ratio of 0.1-1.0% of the hardener to the sand material, heating at a high temperature of 100-110° C. for mixing, and drying, thereby coating the hardener evenly on a surface of the sand material, and then spraying the binder through a nozzle with a mass ratio of the binder to the sand material being 0.5-2.5%; reacting the binder sprayed through the nozzle with the surface of the sand material evenly coated with the hardener to harden a sand mold.

To resolve the foregoing technical problems, the present invention provides a method for producing a binder with basic phenolic resin, comprising the following steps:

stirring 90-110 parts by weight of a phenolic compound, 80-150 parts by weight of polyoxymethylene, and 2-5 parts by weight of a basic catalyst at a normal temperature to form a mixture of a binder, and adding a coupling agent, to obtain the binder with basic phenolic resin.

The effects of the present invention mainly lie in the following:

The binder does not react at 150° C., that is, it will not undergo autodecomposition reaction in the nozzle at a high temperature, and thus has chemical corrosion resistance and high-temperature resistance.

The improvement of the composition and concentration of the binder can not only increase the mechanical strength and hardness of a product, but also overcome the problem of nozzle clogging. In addition, the viscosity of the binder may be adjusted in terms of the formulation and manufacturing process of the binder according to requirements of a piezoelectric nozzle to produce suitable products.

A surface tension value may be adjusted in terms of the formulation and manufacturing process of the binder according to requirements of a piezoelectric nozzle to produce suitable products.

The binder may react with the hardener at −8° C. In the present invention, a high curing speed is provided, and the time required for drying after 3D printing is thus increased, so that the reaction can occur rapidly after the binder is sprayed through the nozzle to bind the sand material, for example, the curing speed applied to quartz sand.

The solids obtained by the additive manufacturing may have a maximum particle size of less than 0.6 μm.

The sand mold may be hardened at the normal temperature. In addition, the hardening speed can be adjusted according to the size of the sand mold. Compared with a general sand mold product, in the present invention, the hardening speed may still be increased when the sand mold has a large size.

The present invention is applicable to dry sand, ceramic sand, and other materials. Even when it is applied to the fine sand material, for example, the fine sand material with the diameter of 9 μm, the sanding can be performed easily.

The binder and the hardener can be stored at the normal temperature, and they are not easy to deteriorate.

The binder may be stored for up to 12-15 months at the normal temperature.

S101-S104: Steps of a method for additive manufacturing;

S201-S203: Steps of a method for producing a binder for additive manufacturing;

S301-S306: Steps of a method for producing a binder with basic phenolic resin; and S401-S406: Steps of another method for producing a binder with basic phenolic resin.

DETAILED DESCRIPTION

Figure 1:
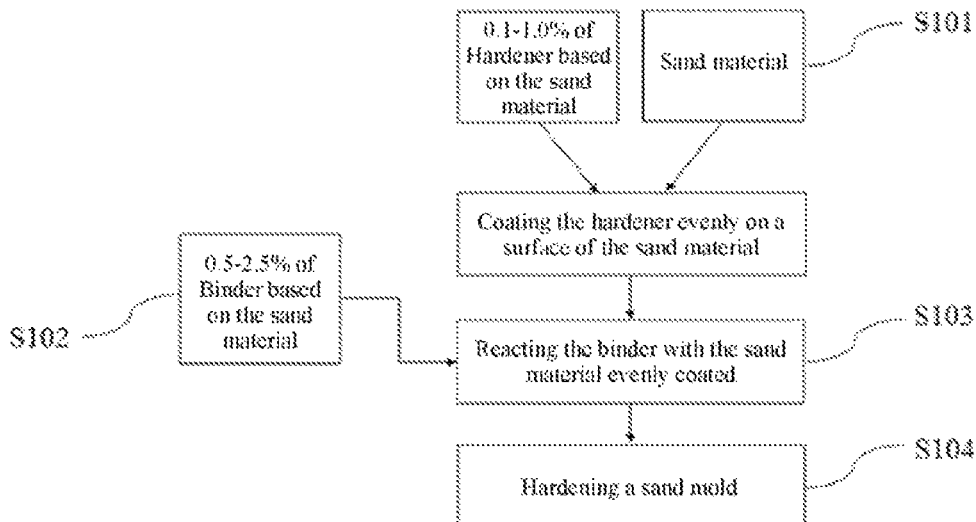
FIG. 1 shows a method for additive manufacturing according to the present invention.

Referring to FIG. 1, to achieve the foregoing objects, the present invention discloses a method for additive manufacturing, including the following steps:

mixing a hardener with a sand material in a mass ratio of 0.1-1.0% of the hardener to the sand material (S101); heating at a high temperature of 100-110° C. for mixing, and drying, thereby coating the hardener evenly on a surface of the sand material; and then spraying a binder through a nozzle, with a mass ratio of the binder to the sand material being 0.5-2.5% (S102); and reacting the binder sprayed through the nozzle with the surface of the sand material evenly coated with the hardener (S103) to harden a sand mold (S104).

The additive manufacturing of a 3D printing sand mold system is based on a process of binding agent spray molding, i.e., an adhesive spraying process. In the process, a sand material is laid on a platform by a sand mold printer, and a binding agent is then sprayed on the sand material through a nozzle according to cutaway drawings. The steps of the laying and spraying are repeated to make the binding agent and the sand material to form a stack, with a thickness of each layer being 0.25-0.4 mm. This process can be used to provide services such as alloy design, simulation analysis, fast molding, and melt casting, and can also be used in a number of applications, including engine parts such as a cylinder head, turbocharger housings, sheet-metal stamping dies, aerospace dashboard frames, gear box housings, industrial pump impellers, and the like.

3D printing, also referred to as additive manufacturing (AM), may be any process of printing three-dimensional objects.

A sand material may be silica sand, ceramic sand, vitrified sand, and other common raw materials for additive manufacturing.

Furfuryl alcohol is also referred to as 2-furan methanol, 2-furylcarbinol, or 2-(hydroxymethyl)furan.

Polyoxymethylene (POM) is also referred to as polymethylene oxide or polymethanal.

Common catalysts may be classified into four types: metal catalysts, oxide catalysts, acid catalysts, and bifunctional catalysts. For the same reactant, if different catalysts are used, different products may be obtained.

Phenolic resin is a synthetic plastic, belonging to a kind of thermosetting resin, and is a polymeric material. It is resistant to weak acids and weak bases, and decomposes in the presence of strong acids. Furan resin (furane resin) is a self-hardening resin.

Binder, also referred to as a binding agent, can be used to bind powders. The binder is sprayed out through a nozzle at the front of a print head. An organic binder is used for ceramic powders, and includes a water-soluble type or a volatile solvent-soluble type. For example, the volatile solvent-soluble type binder is butyral resin. A non-organic binder is usually silicates, such as tetraethoxysilane. It can be incorporated into a printed product directly or through heat curing.

1350-1650 parts by weight of furfuryl alcohol, 2-5 parts by weight of an acid catalyst, 120-180 parts by weight of a phenolic compound, and 60-90 parts by weight of polyoxymethylene are stirred to form a mixture of a binder. The mixture is heated up to 120-150° C. and reacted for 1-2 h. After dehydrating at 85° C. or below, the mixture is cooled down to 45° C. or below, and 5-10 parts by weight of a coupling agent is added, to obtain the binder.

After dehydrating at 85° C. or below, cooling down to 45° C. or below, and adding 5-10 parts by weight of a coupling agent, the mixture may further be filtered through a 0.5-1 μm filter, to obtain a better binder.

In the present invention, p-toluenesulfonic acid is mixed with pure water in a ratio of 70-80 parts by weight to 20-30 parts by weight to form a mixture of the p-toluenesulfonic acid and the pure water, then phosphoric acid is mixed with the mixture of the p-toluenesulfonic acid and the pure water in a ratio of 90-100 parts by weight to 3-7 parts by weight, and the obtained mixture of the phosphoric acid and the mixture of the p-toluenesulfonic acid and the pure water is heated to 60-80° C., and stirred for 1-3 h, to obtain a hardener.

The hardener is mixed with a sand material in a mass ratio of 0.1-1.0% of the hardener to the sand material. The obtained mixture is heated at a high temperature of 100-110° C. for mixing, and dried, so that the hardener is evenly coated on a surface of the sand material. Then, a binder is sprayed through a nozzle, with a mass ratio of the binder to the sand material being 0.5-2.5%. The binder sprayed through the nozzle is reacted with the surface of the sand material evenly coated with the hardener to harden a sand mold.

As described above, the acid catalyst is polyoxymethylene with an optimal ratio of 70-80 parts by weight, and has the best effect in a 24-hour compressive strength test.

As described above, the mass ratio of the binder to the sand material is preferably 0.5-2.5%, and the mass ratio of the hardener to the sand material is preferably 0.1-1.0%.

An optimal mass ratio of the binder to the sand material is 0.8-1.5%, and an optimal mass ratio of the hardener to the sand material is 0.3-0.7%.

As described above, the acid catalyst is selected from one or more of p-toluenesulfonic acid, acetic acid, hydrochloric acid, sulfuric acid, phosphoric acid, and boric acid. A heteropoly acid is usually used as a reusable acid catalyst in chemical reactions. The heteropoly acid is an oxyacid with particular metals and non-metals, such as phosphomolybdic acid. The heteropoly acid is a complex structure formed by a polyoxometalate and other oxyacid polyhedrons. The p-toluenesulfonic acid is a non-oxidizing strong organic acid.

As described above, the acid catalyst is p-toluenesulfonic acid, and exhibits a better effect in the tests of the following examples.

As described above, the phenolic compound is optionally selected from one or more of phenol, bisphenol A, xylenol, m-cresol, resorcinol, and phloroglucinol.

As described above, the coupling agent is optionally selected from one or more of 3-methacryloxypropyltrimethoxysilane, 3-aminopropyltriethoxysilane, 3-glycidoxypropyltrimethoxysilane, and 3-(2-aminoethylamino)propyl-dimethoxymethylsilane.

In general, the standard compressive strength of a test coupon is 35 kg/cm$^2$ or more. The test coupon produced by the present invention has a compressive strength of 10 kg/cm$^2$ or more in 1 hour, and a compressive strength of 50 kg/cm$^2$ or more in 24 hours.

The use of 3D printing technology to manufacturing a resin sand mold can be affected by pH, viscosity, density, and surface tension of the binder. Moreover, in the sand mold manufacturing process, for resin binding, the fluid physical properties of the binder may affect the mixing of silica sand, and the penetration efficiency and binding effect between the silica sand and the binder. Therefore, the quality of resin sand molding may then be affected. In the present invention, by adjusting the ratio of the binder, the hardener, and the sand material, the printing by additive manufacturing can achieve the best effect.

Figure 2:
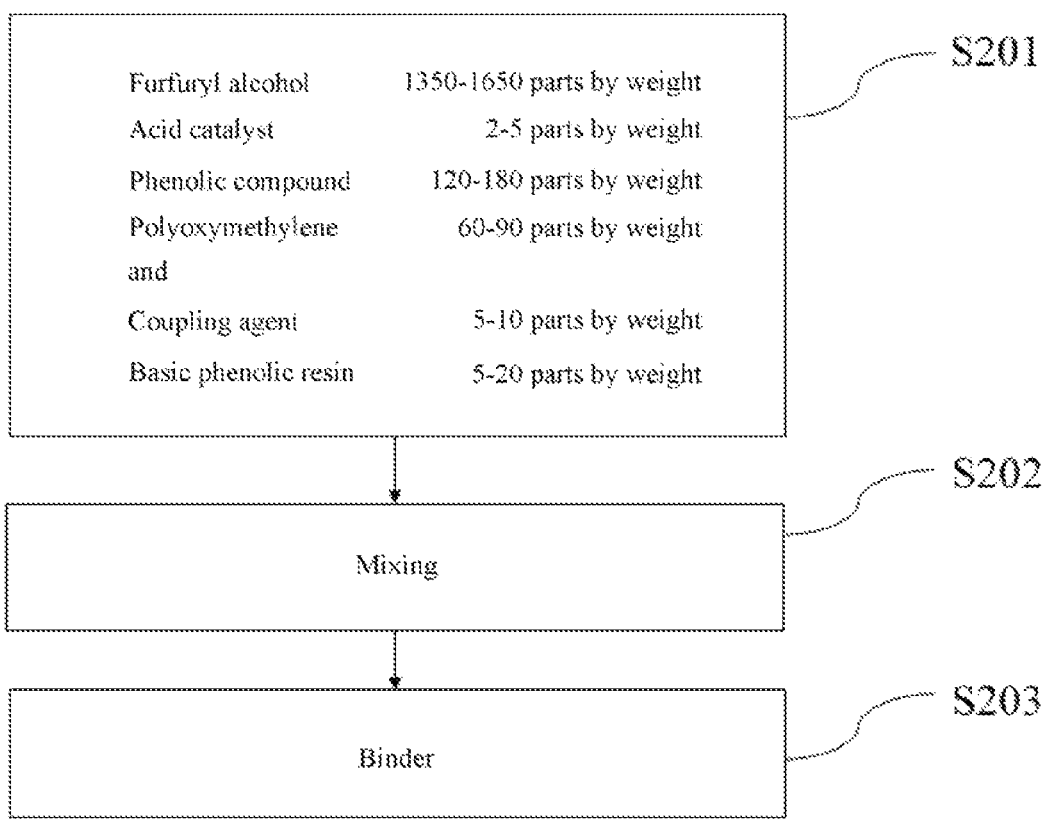
FIG. 2 shows a binder for additive manufacturing according to the present invention.

Referring to FIG. 2, to achieve the foregoing objects, the present invention discloses a method for producing a binder for additive manufacturing. The binder includes the following components: 1350-1650 parts by weight of furfuryl alcohol, 2-5 parts by weight of an acid catalyst, 120-180 parts by weight of a phenolic compound, 60-90 parts by weight of polyoxymethylene, and 5-10 parts by weight of a coupling agent. 1350-1650 parts by weight of furfuryl alcohol, 2-5 parts by weight of an acid catalyst, 120-180 parts by weight of a phenolic compound, 60-90 parts by weight of polyoxymethylene, and 5-10 parts by weight of a coupling agent (S201) are mixed (S202) to obtain the binder (S203).

In the method of the invention, an optimal ratio of the polyoxymethylene is 70-80 parts by weight, and has the best effect in a 24-hour compressive strength test.

In the method of the invention, the acid catalyst is p-toluenesulfonic acid, and exhibits a better effect in the tests of the examples.

In a preferred implementation, the binder is further filtered through a 0.5-1 μm filter.

Figure 3:
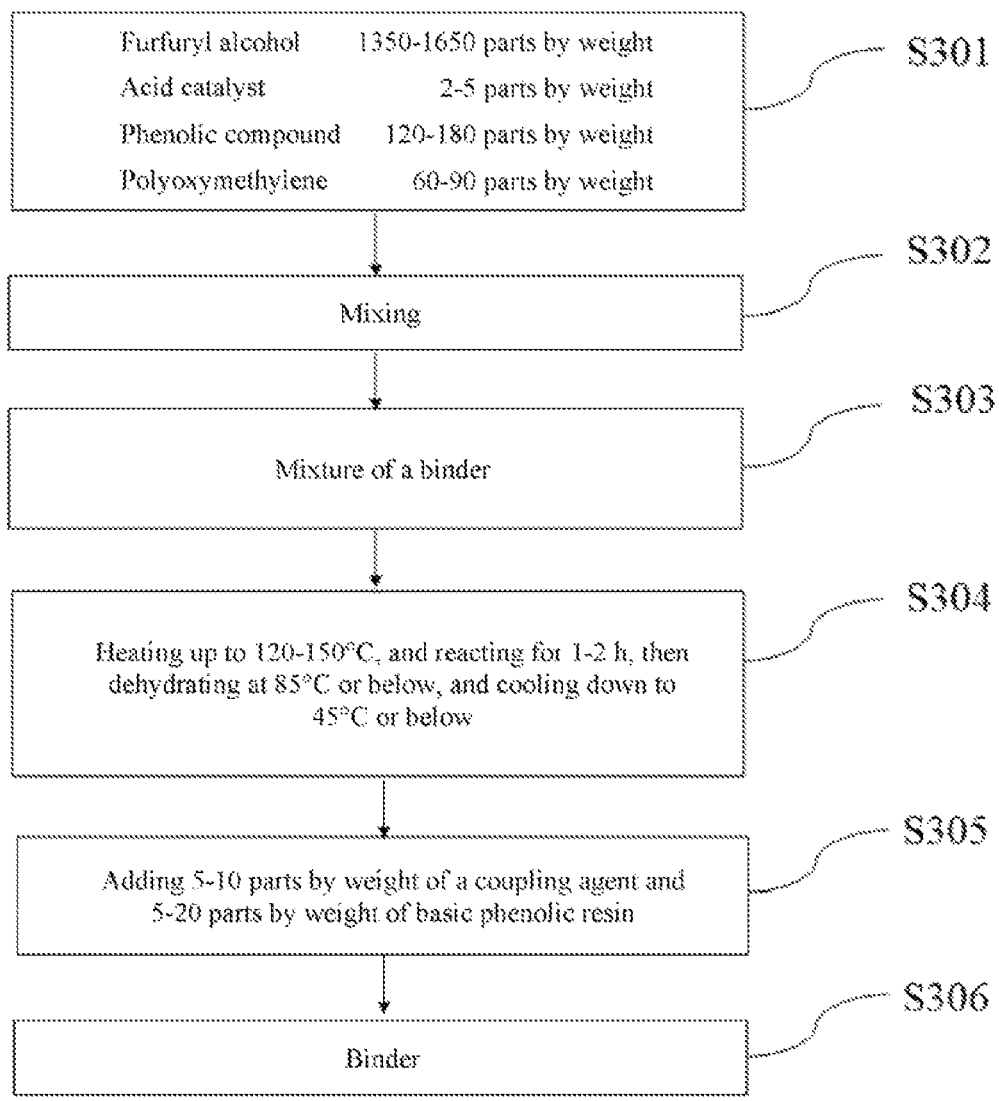
FIG. 3 shows a method for producing a binder with basic phenolic resin according to the present invention.

Referring to FIG. 3, the present invention discloses a method for producing a binder with basic phenolic resin for additive manufacturing, including the following steps: mixing (S302) 1350-1650 parts by weight of furfuryl alcohol, 2-5 parts by weight of an acid catalyst, 120-180 parts by weight of a phenolic compound, and 60-90 parts by weight of polyoxymethylene (S301) with stirring to provide a mixture of a binder (S303), heating up to 120-150° C. and reacting for 1-2 h, and then dehydrating at 85° C. or below, cooling down to 45° C. or below (S304), and adding 5-10 parts by weight of a coupling agent and 5-20 parts by weight of basic phenolic resin (S305), to obtain the binder (S306).

Referring to FIG. 3, to achieve the foregoing objects, the present invention discloses a method for producing a binder with basic phenolic resin for additive manufacturing, including the following steps: stirring 1350-1650 parts by weight of furfuryl alcohol, 2-5 parts by weight of an acid catalyst, 120-180 parts by weight of a phenolic compound, and 60-90 parts by weight of polyoxymethylene to form a mixture of a binder, heating up to 120-150° C. and reacting for 1-2 h, and then dehydrating in vacuum at 85° C. or below, cooling down to 45° C. or below, and adding 5-10 parts by weight of a coupling agent and 5-20 parts by weight of basic phenolic resin, to obtain the binder with basic phenolic resin.

The method further includes mixing p-toluenesulfonic acid with pure water in a ratio of 70-80 parts by weight to 20-30 parts by weight to form a mixture of the p-toluenesulfonic acid and the pure water, then mixing phosphoric acid with the mixture of the p-toluenesulfonic acid and the pure water in a ratio of 90-100 parts by weight to 3-7 parts by weight, and heating the obtained mixture of the phosphoric acid and the mixture of the p-toluenesulfonic acid and the pure water to 60-80° C., and then stirring for 1-3 h, to obtain a hardener.

The method further includes mixing the hardener with a sand material in a mass ratio of 0.1-1.0% of the hardener to the sand material; heating the obtained mixture at a high temperature of 100-110° C. for mixing, and drying, thereby coating the hardener evenly on a surface of the sand material, then spraying the binder through a nozzle, with a mass ratio of the binder to the sand material being 0.5-2.5%, and reacting the binder sprayed through the nozzle with the surface of the sand material evenly coated with the hardener to harden a sand mold.

In a preferred implementation, the binder is further filtered through a 0.5-1 μm filter after adding 5-10 parts by weight of a coupling agent and 5-20 parts by weight of basic phenolic resin.

The acid catalyst is selected from one or more of p-toluenesulfonic acid, acetic acid, hydrochloric acid, sulfuric acid, phosphoric acid, and boric acid. A heteropoly acid is usually used as a reusable acid catalyst in chemical reactions. The heteropoly acid is an oxyacid with particular metals and non-metals, such as phosphomolybdic acid. The heteropoly acid is a complex structure formed by a polyoxometalate and other oxyacid polyhedrons.

The coupling agent is optionally selected from one or more of 3-methacryloxypropyltrimethoxysilane, 3-aminopropyltriethoxysilane, 3-glycidoxypropyltrimethoxysilane, and 3-(2-aminoethylamino)propyl-dimethoxymethylsilane.

As described above, an optimal ratio of the polyoxymethylene is 70-80 parts by weight, and has the best effect in a 24-hour compressive strength test.

As described above, the acid catalyst is p-toluenesulfonic acid, and exhibits a better effect in the tests of the examples.

To achieve the foregoing objects, the present invention discloses a method for producing a binder with basic phenolic resin, including the following steps: mixing 1350-1650 parts by weight of furfuryl alcohol, 2-5 parts by weight of a basic catalyst, 120-180 parts by weight of a phenolic compound, and 60-90 parts by weight of polyoxymethylene with stirring to form a mixture of a binder, heating up to 120-150° C. and reacting for 1-2 h, and then dehydrating at 85° C. or below, cooling down to 45° C. or below, and adding 5-10 parts by weight of a coupling agent, to obtain the binder.

Figure 4:
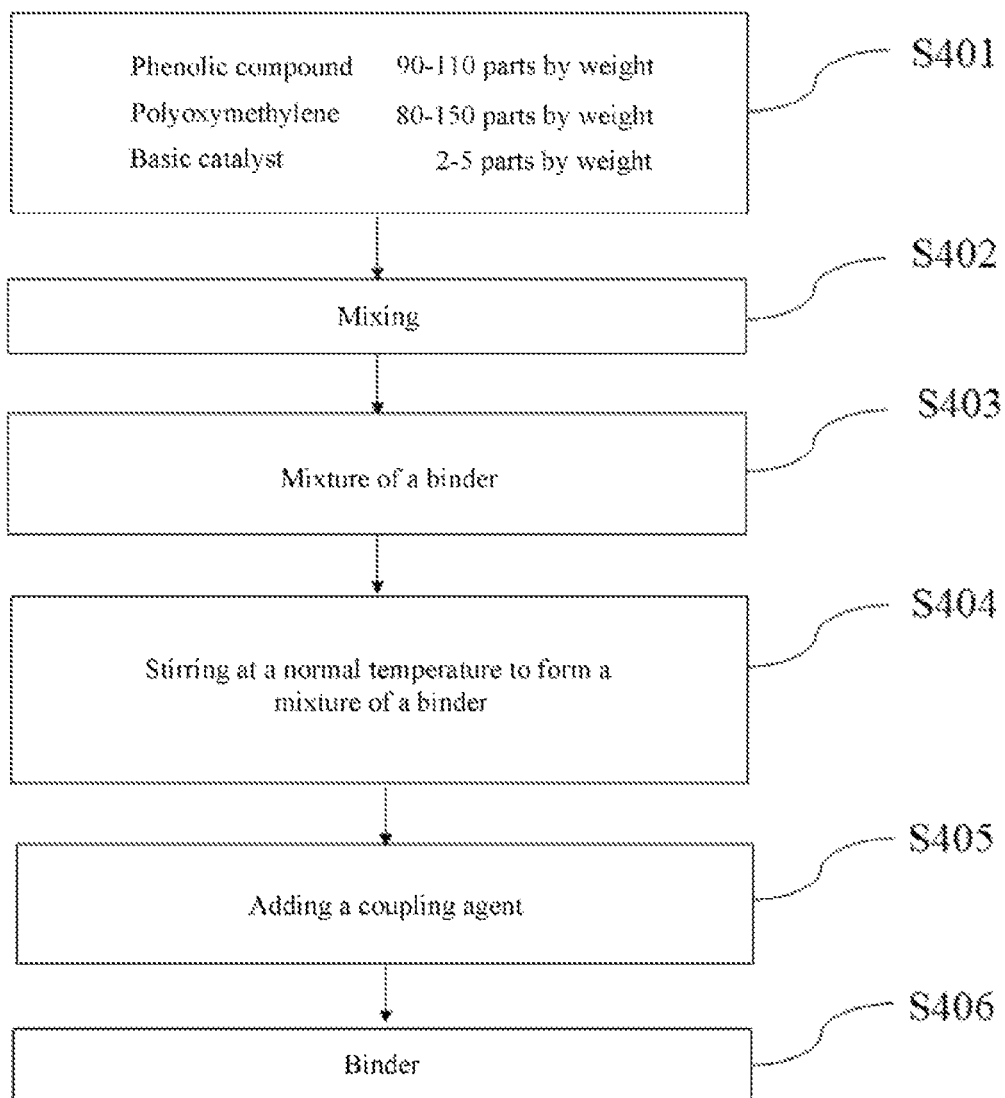
FIG. 4 shows another method for producing a binder with basic phenolic resin according to the present invention.

Referring to FIG. 4, to achieve the foregoing objects, the present invention discloses a method for producing a binder with basic phenolic resin, including the following steps: mixing (S402) 90-110 parts by weight of a phenolic compound, 80-150 parts by weight of polyoxymethylene, and 2-5 parts by weight of a basic catalyst (S401) with stirring to form a mixture of a binder (S403), stirring at a normal temperature to form a mixture of a binder (S404), and adding 5-10 parts by weight of a coupling agent (S405), to obtain the binder (S406). A method for producing a binder with basic phenolic resin includes the following steps: stirring 90-110 parts by weight of a phenolic compound, 80-150 parts by weight of polyoxymethylene, and 2-5 parts by weight of a basic catalyst at a normal temperature to form a mixture of a binder, and adding a coupling agent, to obtain the binder with basic phenolic resin.

The method further includes mixing p-toluenesulfonic acid with pure water in a ratio of 70-80 parts by weight to 20-30 parts by weight to form a mixture of the p-toluenesulfonic acid and the pure water, then mixing phosphoric acid with the mixture of the p-toluenesulfonic acid and the pure water in a ratio of 90-100 parts by weight to 3-7 parts by weight, and heating the obtained mixture of the phosphoric acid and the mixture of the p-toluenesulfonic acid and the pure water to 60-80° C., and stirring for 1-3 h, to obtain a hardener.

The method further includes mixing the hardener with a sand material in a mass ratio of 0.1-1.0% of the hardener to the sand material; heating at a high temperature of 100-110° C. for mixing, and drying, thereby coating the hardener evenly on a surface of the sand material, then spraying a binder through a nozzle, with a mass ratio of the binder to the sand material being 0.5-2.5%; and reacting the binder sprayed through the nozzle with the surface of the sand material evenly coated with the hardener to harden a sand mold.

In a preferred implementation, the binder is further filtered through a 0.5-1 μm filter after adding 5-10 parts by weight of a coupling agent.

An optimal mass ratio of the binder to the sand material is 0.8-1.5%, and an optimal mass ratio of the hardener to the sand material is 0.3-0.7%.

The coupling agent is optionally selected from one or more of 3-methacryloxypropyltrimethoxysilane, 3-aminopropyltriethoxysilane, 3-glycidoxypropyltrimethoxysilane, and 3-(2-aminoethylamino)propyl-dimethoxymethylsilane.

The reaction product obtained by adding the basic catalyst in the production of the basic phenolic resin may vary depending on the proportion and the acidity and basicity of the catalyst, such as sodium hydroxide, potassium hydroxide, and other common basic catalyst reagents. A resin product is catalyzed by the basic catalyst.

Because the hardener is pre-mixed with the sand material, the efficiency of sand spraying may be improved, and the shortcomings of easy clogging caused by using wet sand as the sand material in the related art can be overcome.

Example 1

The present invention provided a binding agent for additive manufacturing:

The binding agent included the following components: 1500 parts by weight of furfuryl alcohol, 2 parts by weight of an acid catalyst, 160 parts by weight of a phenolic compound, 70 parts by weight of polyoxymethylene, and 6 parts by weight of a coupling agent.

Example 2

The present invention provided another binding agent for additive manufacturing:

The binding agent included the following components: 1650 parts by weight of furfuryl alcohol, 3 parts by weight of an acid catalyst, 170 parts by weight of a phenolic compound, 85 parts by weight of polyoxymethylene, and 7 parts by weight of a coupling agent.

Example 3

The present invention provided a method for producing a binder for additive manufacturing, including the following steps:

Binder 1500 parts by weight of furfuryl alcohol, 2 parts by weight of an acid catalyst, 150 parts by weight of a phenolic compound, and 75 parts by weight of polyoxymethylene were stirred at a normal temperature to form a mixture of a binder. The mixture was heated up to 120° C., and reacted for 2 h, and then dehydrated at 80° C. The mixture was cooled down to 45° C., and then 6 parts by weight of a coupling agent was added, to obtain the binder.

The acid catalyst was acetic acid, the phenolic compound was phenol, and the coupling agent was 3-aminopropyltriethoxysilane.

Example 4

The present invention provided a method for producing a binder with basic phenolic resin for additive manufacturing. In the method, a hardener was mixed with a sand material. The obtained mixture was heated at a high temperature of 100° C. for mixing, and dried, so that the hardener was evenly coated on a surface of the sand material. Then, a binder was sprayed through a nozzle, and the binder sprayed through the nozzle was reacted with the surface of the sand material evenly coated with the hardener to harden a sand mold.

Binder 1500 parts by weight of furfuryl alcohol, 2 parts by weight of an acid catalyst, 150 parts by weight of a phenolic compound, and 70 parts by weight of polyoxymethylene were stirred at a normal temperature to form a mixture of a binder. The mixture was heated up to 120° C., and reacted for 2 h, and then dehydrated at 70° C. The mixture was cooled down to 40° C., and 6 parts by weight of a coupling agent and 15 parts by weight of basic phenolic resin were added, and then filtered through a 0.5-1 μm filter, to obtain the binder.

The self-hardening synthetic resin had the following physical properties:

Specific gravity (25° C.): 1.11-1.15;
Viscosity (30° C.): 8-20 CPS;
pH (25° C.): 7-8;
Water content: 3% or less;
Solid content: 35% or less;
Free aldehyde: 1% or less;

The acid catalyst was zinc acetate, the phenolic compound was phenol, and the coupling agent was 3-aminopropyltriethoxysilane.

Hardener

P-toluenesulfonic acid was mixed with pure water in a ratio of 75 parts by weight to 25 parts by weight to form a mixture of the p-toluenesulfonic acid and the pure water. Then, phosphoric acid was mixed with the mixture of the p-toluenesulfonic acid and the pure water in a ratio of 95 parts by weight to 5 parts by weight. The obtained mixture of the phosphoric acid and the mixture of the p-toluenesulfonic acid and the pure water was heated to 60° C., and then stirred for 3 h, to obtain a hardener.

Sand Mold

The hardener was mixed with a sand material, with a mass ratio of the hardener to the sand material being 0.7%. The obtained mixture was heated at a high temperature of 100° C. for mixing, and dried, so that the hardener was evenly coated on a surface of the sand material. A binder of silicon dioxide was then sprayed through a nozzle, with a mass ratio of the binder of silicon dioxide to the sand material being 1.5%. The binder of silicon dioxide sprayed through the nozzle was reacted with the surface of the sand material evenly coated with the hardener to harden a sand mold.

To 1 kg of silica sand used as the sand material was added 2.5 g of the hardener of p-toluenesulfonic acid. After mixing for 60 s, the obtained mixture was collected for later use. The mixture was heated at a high temperature of 100° C. for mixing, and dried. Then, 16.5 g of resin was sprayed through a nozzle to harden a sand mold. The sand mold was kept at a normal temperature for about 24 hours, and the hardness and compressive strength of a test coupon were measured.

Experimental Result

The compressive strength of the test coupon was measured, and a maximum stress value of the material before brittle fracture was measured, until the fracture occurred.

Referring to Table 1, a standard compressive strength of a test coupon is generally 35 kg/cm$^2$ or more. The test coupon produced by the present invention has a compressive strength of 10 kg/cm$^2$ or more in 1 hour, and a compressive strength of 50 kg/cm$^2$ or more in 24 hours.

TABLE 1

Compressive strength data of a test coupon of the present invention

| Time (h) | standard compressive strength of a test coupon | Test coupon of the present invention |
| --- | --- | --- |
| 1 hour Compressive strength | 10 kg/cm$^2$ or more | 10 kg/cm$^2$ or more |
| 24 hours Compressive strength | 35 kg/cm$^2$ or more | 50 kg/cm$^2$ or more |

Table 2 shows the compressive strength of a test coupon with 1.5% by weight of a binder added. Groups A1-A8 are respectively added with 0.05%, 0.10%, 0.30%, 0.50%, 0.70%, 0.90%, 1.00%, and 1.10% by weight of hardener, that is, the hardeners added in A1-A8 are at an amount of 0.5 g, 1 g, 3 g, 5 g, 7 g, 9 g, 10 g, and 11 g respectively, wherein the binders are added at an amount of 15 g, and the sand materials are added at an amount of 1000 g.

TABLE 2

Compressive strength data of a test coupon with 1.5% by weight of a binder added

| Group | Sand material | Hardener | Binder | 1 hour Compressive strength (kg/cm$^2$) | 24 hours Compressive strength (kg/cm$^2$) |
| --- | --- | --- | --- | --- | --- |
| A1 | 100% | 0.05% | 1.5% | — | 31 |
| A2 | 100% | 0.1% | 1.5% | — | 45 |
| A3 | 100% | 0.3% | 1.5% | 10 | 50 |
| A4 | 100% | 0.5% | 1.5% | 10 | 49 |
| A5 | 100% | 0.7% | 1.5% | 10 | 50 |
| A6 | 100% | 0.9% | 1.5% | — | 46 |
| A7 | 100% | 1.0% | 1.5% | — | 46 |
| A8 | 100% | 1.1% | 1.5% | — | 30 |

Figure 5:
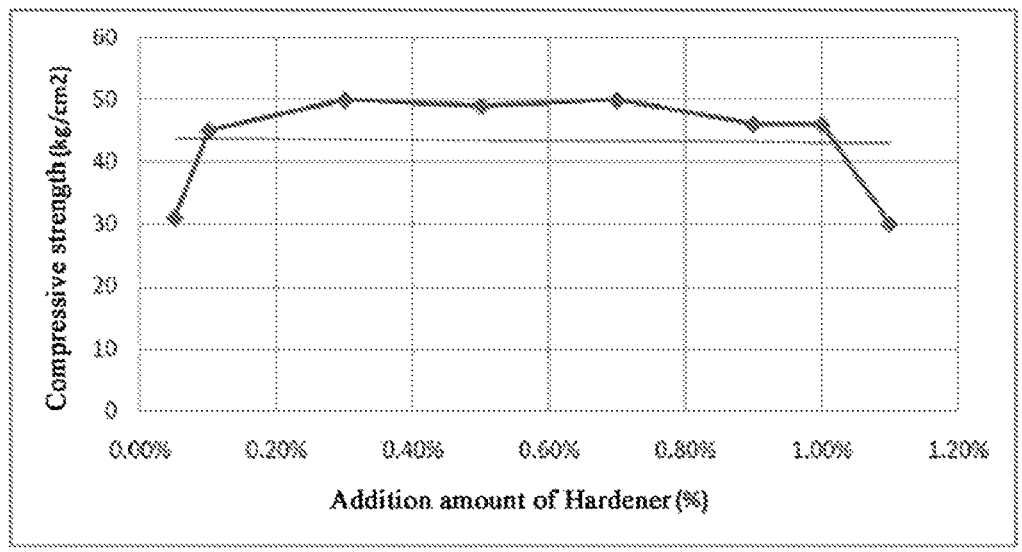
FIG. 5 is a data graph of the compressive strength of a test coupon with 1.5% by weight of a binder added.

FIG. 5 is a data graph of the compressive strength of a test coupon with 1.5% by weight of a binder added.

Table 3 shows the compressive strength of a test coupon with 0.7% by weight of a hardener added. Groups B1-B8 are respectively added with 0.3%, 0.5%, 0.8%, 1.3%, 1.5%, 2.0%, 2.5%, and 3.0% by weight of a binder, that is, the binders added in B1-B8 are at an amount of 3 g, 5 g, 8 g, 13 g, 15 g, 20 g, 25 g, and 30 g respectively, wherein the hardeners are added at an amount of 7 g, and the sand materials are added at an amount of 1000 g.

TABLE 3

Compressive strength data of a test coupon with 0.7% by weight of a hardener added

| Group | Sand material | Hardener | Binder | 1 hour Compressive strength (kg/cm$^2$) | 24 hours Compressive strength (kg/cm$^2$) |
| --- | --- | --- | --- | --- | --- |
| B1 | 100% | 0.7% | 0.3% | — | 29 |
| B2 | 100% | 0.7% | 0.5% | — | 46 |
| B3 | 100% | 0.7% | 0.8% | 10 | 49 |
| B4 | 100% | 0.7% | 1.3% | 10 | 50 |
| B5 | 100% | 0.7% | 1.5% | 10 | 51 |
| B6 | 100% | 0.7% | 2.0% | — | 48 |
| B7 | 100% | 0.7% | 2.5% | — | 47 |
| B8 | 100% | 0.7% | 3.0% | — | 26 |

Figure 6:
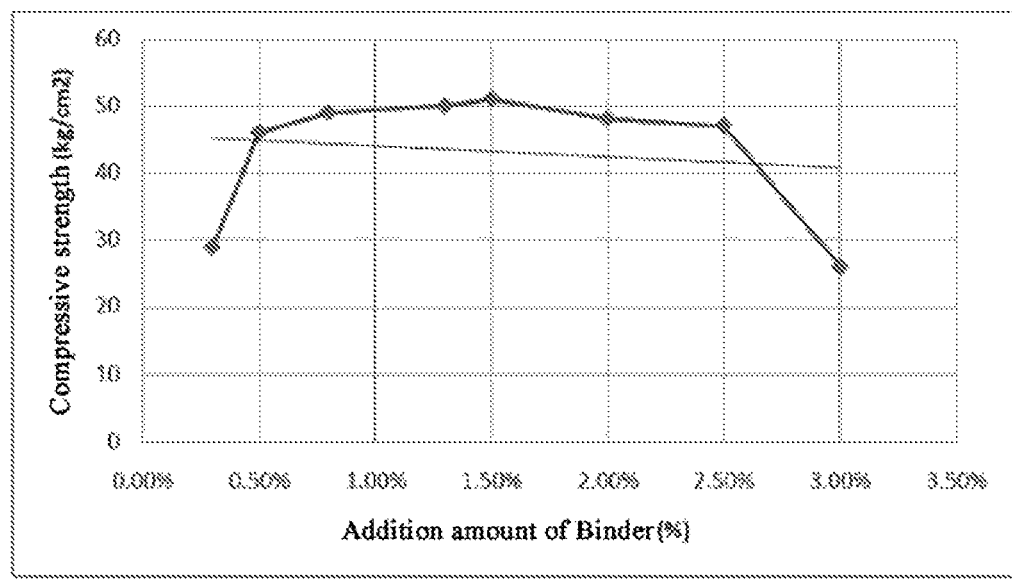
FIG. 6 is a data graph of the compressive strength of a test coupon with 0.7% by weight of a hardener added.

FIG. 6 is a data graph of the compressive strength of a test coupon with 0.7% by weight of a hardener added.

1500 parts by weight of furfuryl alcohol, 2 parts by weight of an acid catalyst, 150 parts by weight of a phenolic compound, and polyoxymethylene were stirred at a normal temperature to form a mixture of a binder. The mixture was heated up to 120° C., and reacted for 2 h, and then dehydrated at 70° C. The mixture was cooled down to 40° C., and 6 parts by weight of a coupling agent and 10 parts by weight of basic phenolic resin were added, to obtain the binder.

Table 4 shows experimental data of groups C1-C5 with 65 parts by weight, 70 parts by weight, 75 parts by weight, 80 parts by weight, and 85 parts by weight of polyoxymethylene added respectively.

TABLE 4

Experimental data of test coupons with different amounts of polyoxymethylene added

| Group | Polyoxymethylene Parts by weight | 24 hours Compressive strength (kg/cm$^2$) |
| --- | --- | --- |
| C1 | 65 parts by weight | 46 |
| C2 | 70 parts by weight | 51 |
| C3 | 75 parts by weight | 52 |
| C4 | 80 parts by weight | 51 |
| C5 | 85 parts by weight | 44 |

The experimental results show that:

In a method for producing a binder with basic phenolic resin for additive manufacturing of the present invention, referring to Table 2, a mass ratio of the binder with basic phenolic resin to the sand material is preferably 0.5-2.5%, and referring to Table 3, a mass ratio of the hardener to the sand material is preferably 0.1-1.0%.

Referring to Table 2, an optimal mass ratio of the binder with basic phenolic resin to the sand material is 0.8-1.5%. Referring to Table 3, an optimal mass ratio of the hardener to the sand material is 0.3-0.7%.

Referring to Table 4, in a method for producing a binder with basic phenolic resin for additive manufacturing, an optimal ratio of the polyoxymethylene is 70-80 parts by weight.

The foregoing descriptions are merely preferred implementations or examples of the technical means adopted by the present invention to resolve the problems, and are not intended to limit the scope of the present invention. That is, any equivalent changes and modifications literally conforming to the scope of the claims of the present invention or made according to the scope of the claims of the present invention shall fall within the present invention.

What is claimed is:

1. A method for additive manufacturing, comprising the following steps:

stirring 1350-1650 parts by weight of furfuryl alcohol, 2-5 parts by weight of an acid catalyst, 120-180 parts by weight of a phenolic compound, and 60-90 parts by weight of polyoxymethylene to form a mixture of a binder, heating up to 120-150° C. and reacting for 1-2 h, then dehydrating at 85° C. or below, cooling down to 45° C. or below, and adding 5-10 parts by weight of a coupling agent, to obtain the binder;

mixing p-toluenesulfonic acid with pure water in a ratio of 70-80 parts by weight to 20-30 parts by weight to form a mixture of the p-toluenesulfonic acid and the pure water, mixing phosphoric acid with the mixture of the p-toluenesulfonic acid and the pure water in a ratio of 90-100 parts by weight to 3-7 parts by weight, heating the obtained mixture of the phosphoric acid and the mixture of the p-toluenesulfonic acid and the pure water to 60-80° C., and stirring for 1-3 h, to obtain a hardener;

mixing the hardener with a sand material in a mass ratio of 0.1-1.0% of the hardener to the sand material, heating at a high temperature of 100-110° C. for mixing, and drying, thereby coating the hardener evenly on a surface of the sand material, and then spraying the binder through a nozzle, with a mass ratio of the binder to the sand material being 0.5-2.5%;

reacting the binder sprayed through the nozzle with the surface of the sand material evenly coated with the hardener to harden a sand mold.

2. The method for additive manufacturing according to claim 1, wherein the polyoxymethylene is 70-80 parts by weight.

3. The method for additive manufacturing according to claim 1, wherein an optimal ratio of the hardener to the sand material is 0.3-0.7%, and an optimal ratio of the binder to the sand material is 0.8-1.5%.

4. The method for additive manufacturing according to claim 1, wherein the acid catalyst is one selected from a group consisting of p-toluenesulfonic acid, acetic acid, hydrochloric acid, sulfuric acid, phosphoric acid, and boric acid.

5. The method for additive manufacturing according to claim 1, wherein the acid catalyst is p-toluenesulfonic acid.

6. The method for additive manufacturing according to claim 1, wherein the phenolic compound is one selected from a group consisting of phenol, bisphenol A, xylenol, m-cresol, resorcinol, and phloroglucinol.

7. The method for additive manufacturing according to claim 1, wherein the coupling agent is one selected from a group consisting of 3-methacryloxypropyltrimethoxysilane, 3-aminopropyltriethoxysilane, 3-glycidoxypropyltrimethoxysilane, and 3-(2-aminoethylamino)propyl-dimethoxymethylsilane.

8. A method for producing a binder for additive manufacturing, comprising the following steps:

stirring 1350-1650 parts by weight of furfuryl alcohol, 2-5 parts by weight of an acid catalyst, 120-180 parts by weight of a phenolic compound, and 60-90 parts by weight of polyoxymethylene to form a mixture of a binder, heating up to 120-150° C. and reacting for 1-2 h, then dehydrating at 85° C. or below, cooling down to 45° C. or below, and adding 5-10 parts by weight of a coupling agent, to obtain the binder.

9. The method for producing a binder for additive manufacturing according to claim 8, wherein the polyoxymethylene is preferably 70-80 parts by weight.

10. The method for producing a binder for additive manufacturing according to claim 8, wherein the acid catalyst is p-toluenesulfonic acid.

11. A method for additive manufacturing with a basic phenolic resin binder, comprising the following steps:

stirring 1350-1650 parts by weight of furfuryl alcohol, 2-5 parts by weight of an acid catalyst, 120-180 parts by weight of a phenolic compound, and 60-90 parts by weight of polyoxymethylene to form a mixture of a binder, heating up to 120-150° C. and reacting for 1-2 h, then dehydrating at 85° C. or below, cooling down to 45° C. or below, and adding 5-10 parts by weight of a coupling agent and 5-20 parts by weight of basic phenolic resin, to obtain the binder;

mixing p-toluenesulfonic acid with pure water in a ratio of 70-80 parts by weight to 20-30 parts by weight to form a mixture of the p-toluenesulfonic acid and the pure water, mixing phosphoric acid with the mixture of the p-toluenesulfonic acid and the pure water in a ratio of 90-100 parts by weight to 3-7 parts by weight, heating the obtained mixture of the phosphoric acid and the mixture of the p-toluenesulfonic acid and the pure water to 60-80° C., and stirring for 1-3 h, to obtain a hardener;

mixing the hardener with a sand material in a mass ratio of 0.1-1.0% of the hardener to the sand material, heating at a high temperature of 100-110° C. for mixing, and drying, thereby coating the hardener evenly on a surface of the sand material, and then spraying the binder through a nozzle, with a mass ratio of the binder to the sand material being 0.5-2.5%;

reacting the binder sprayed through the nozzle with the surface of the sand material evenly coated with the hardener to harden a sand mold.

\* \* \* \* \*